United States Patent [19]

Leicht

[11] Patent Number: 4,677,133
[45] Date of Patent: Jun. 30, 1987

[54] THERMALLY APPLIED SEALANTS AND PROCESS

[75] Inventor: Larry F. Leicht, Hurst, Tex.

[73] Assignee: Q'SO, Inc., Saginaw, Tex.

[21] Appl. No.: 820,532

[22] Filed: Jan. 17, 1986

Related U.S. Application Data

[63] Continuation-in-part of Ser. No. 637,718, Aug. 6, 1984, abandoned.

[51] Int. Cl.$^4$ ............................................. C08J 9/34
[52] U.S. Cl. ...................................... 521/51; 521/139
[58] Field of Search ................................. 521/51, 139

[56] References Cited

U.S. PATENT DOCUMENTS

| | | | |
|---|---|---|---|
| 4,156,754 | 5/1979 | Cobbs | 428/310 |
| 4,256,850 | 3/1981 | Thorsrud | 521/139 |
| 4,303,756 | 12/1981 | Kajimura | 521/139 |
| 4,352,854 | 10/1982 | Siedenstrang | 521/51 |
| 4,590,123 | 5/1986 | Hashimoto | 521/139 |
| 4,592,690 | 6/1986 | Busch | 413/19 |

Primary Examiner—Paul R. Michl
Attorney, Agent, or Firm—Richards, Harris, Medlock & Andrews

[57] ABSTRACT

Elastomer compositions suitable for use in foaming operations and elastomeric cellular products and processes of forming such products. The elastomer compositions comprise a mixture of two thermoplastic rubber compounds, at least one of which has a vinyl aromatic component and a higher aromaticity than the other rubber compound. The compositions also contains a nucleating agent which functions when gas is entrained in the molten elastomer formulation to enhance the neutrophilic structure of the elastomer. An unstable resin is also present in the elastomer compositions. This resin is oxidized or thermally decomposed as the foamed product is cured to produce a relatively nontactified skin. Cellular elastomeric products may be formed by incorporating an inert gas into the molten elastomer compositions by the use of gas infusing equipment or by the decomposition of blowing agents. The blowing agents may be supplied to the molten elastomer composition entrained within a plasticizing oil.

53 Claims, 1 Drawing Figure

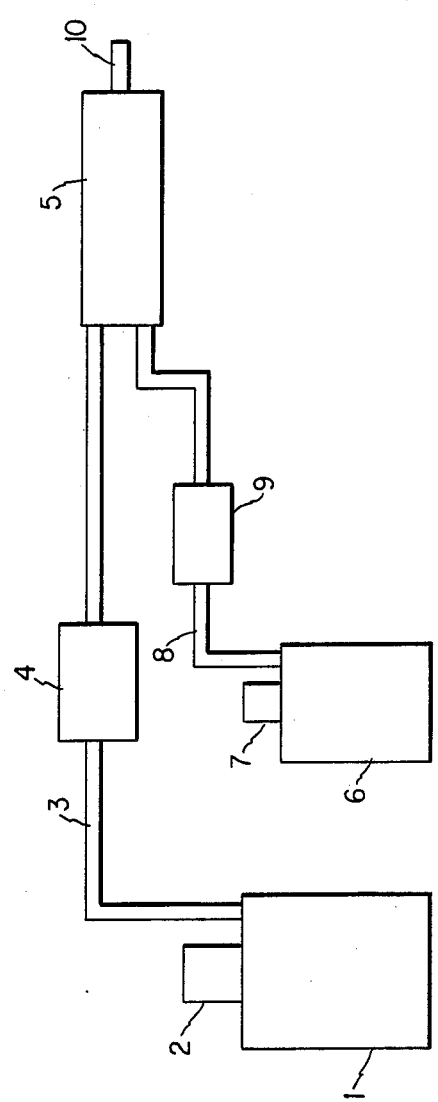

THERMALLY APPLIED SEALANTS AND PROCESS

This application is a continuation-in-part of application Ser. No. 637,718 filed Aug. 6, 1984, abandoned.

TECHNICAL FIELD

This invention relates to elastomer compositions and more particularly to multicomponent elastomer compositions and their use in forming cellular elastomeric products by hot melt extrusion techniques.

BACKGROUND OF THE INVENTION

It is a common practice to blend polymeric rubber compounds with other compounds which may function as processing aids or impart desirable characteristics to the final product. Such other compounds include polymers which may be elastomers or non-elastomers, oils, plasticizers, and the like. For example, U.S. Pat. No. 3,632,540 to Unmuth et al discloses binary and ternary elastomer compositions based upon thermoplastic elastomeric block copolymers characterised as A—B—A copolymers. In this designation, the A and B blocks indicate nonelastomeric and elastomeric polymer blocks, respectively. As disclosed in Unmuth, the end blocks may take the form of alkenyl arenes and the elastomeric B block the form of polymerized conjugated dienes. The block copolymers may be "pure" block copolymers or "tapered" block copolymers. The elastomeric midblock sections can be formed essentially of any synthetic elastomer, preferably of an aliphatic conjugated diene, such as isoprene, methyl isoprene, butadiene, styrene-butadiene copolymers and butadiene-acrylonitrile. The elastomeric midblock sections may comprise copolymers of ethylene with $C_3$–$C_8$ monoolefins, preferably $C_3$–$C_6$ alpha olefins. As disclosed in Unmuth, suitable vinyl aromatic endblocks may be derived from styrene, vinyl toluene, vinylxylene, ethylvinylbenzene, isopropylstyrene, ethylvinyltoluene, tert.-butylstyrene or diethylstyrene. Copolymers containing at least 70% weight vinylaromatics and 30% or less alphamethylstyrene or esters of acrylic or methacrylic acid may also be employed.

The A—B—A type polymers thus described are blended with natural or synthetic waxes in the binary compound and, optionally in the ternary compounds, with certain resins which do not exhibit liquid-phase separation. Suitable waxes include natural or synthetic waxes such as paraffin wax, scale wax and polyalkylenes such as polyethylene, polypropylene, and blends and copolymers thereof. The resin in the ternary mixture is employed to enhance the blendability and viscosity of the block copolymer and wax mixture. Suitable resins include rosin, hydrogenated rosin, esters of rosin and hydrogenated rosin and dimerized rosin and esters thereof. Various other resins are also disclosed and, in addition, the elastomer compositions can contain other additives such as antioxidants, friction reducing additives, pigments and fillers, and various other synthetic rubbers, copolymers and homopolymers. The compositions may be employed in formulating coatings laminates, hot melt adhesives, and caulking compounds.

U.S. Pat. No. 4,369,284, to Chen discloses a gelatinous multicomponent elastomer composition based upon specific ABA triblock copolymers of the type disclosed generally in the aforementioned patent to Unmeth et al. Thus, Chen discloses a mixture of styrene-ethylene/butylene-styrene triblock copolymer and a plasticizing oil such as white petroleum oil or a synthetic liquid oligomer of polybutene, polypropene or polyterpene. The copolymer is characterized as having a styrene end block to ethylene/butylene center block ratio within the range of 31:69–40:60. A suitable copolymers is identified as Shell Chemical Company's Kraton G-1651. Copolymers identified as Kraton G 1650 and G 1652 are characterized as too low in styrene content.

Yet another multicomponent elastomer mixture is disclosed in U.S. Pat. No. 4,377,655 to Himes. The compostion, which is employed in molded shoe soles, is based upon a mixture of a linear ABA block copolymer and a radial $(A—B)_x B—A$ block copolymer. The A blocks are monoalkynyl arene polymers having average molecular weights within the range of about 5,000–45,000 and the B blocks are elastomeric conjugated diene polymers having average molecular weights within the range of about 15,000–300,000. The compositions also contain a styrene-acrylonitrile copolymer and a vulcanized vegetable oil and may optionally contain a hydrocarbon rubber extending oil and a finely divided filler. The extending oils are characterized as paraffinic naphthenic oils having less than 30 weight % aromatics and viscosities within the range of about 100–500 SSU. Fillers which may be used include clay, talc, alumina, anhydrous silica, titaniumdioxide, carbon black calcium, calcium carbonate, and fibers such as polyester or acrylic fibers. The composition may also contain a minor amount of stearic acid.

U.S. Pat. No. 4,101,482 to Doss et al discloses a low tack sealant composition comprising a mixture of two block copolymers, modifying resin, and a filler. The block copolymers may be thermoplastic AB and ABA $(AB)_nY$ copolymers with A representing polyvinyl aromatic blocks and B poly conjugated diene blocks. Thus, the A blocks may be derived from styrene, methylstyrene, propylstyrene and vinylnaphthalene. The conjugated diene blocks are derived from $C_4$–$C_8$ monomers which include 1,3-butadiene, isoprene, 1,3-pentadiene, 2,4-hexadiene and 3-ethyl-1,3-pentadiene. The polymers preferably have A/B weight ratios within the range of 40/60–15/85. The modifying resin employed in the formulation is a normally solid resin such as a modified or unmodified rosin or rosin ester, esters of polymerized rosin, polyterpene resins, terpenephenolic resins, coumaroneindene resins, diolefinolefin resins, phenol-aldehyde resins, alpha-methyl styrene copolymers. Plasticizers include polyolefins such as polybutene, naphthenic, paraffinic or aromatic oils, various esters, and chlorinated hydrocarbons. Fillers disclosed in Doss et al include calcium carbonate, aluminum silicate, clay, talc, kaolin, barytes, mica, silica and mixtures thereof. Carbon black and titanium dioxide may also be added as pigments. The formulation may also include sterically hindered phenols and other antioxidants and antiozonants as stabilizers.

Many elastomeric polymers are readily subject to foaming to form cellular rubber products that may be either open celled or closed celled. Such products and their preparation are discussed by Bascom, R.C. "Cellular Elastomers" Rubber Age p. 576, July, 1964. Closed-celled products are employed in gaskets and other similar packing products since the void volume of the product is predominantly in the form of a discrete cells disposed throughout the product so that it is a relatively impermeable to gas flow. The cellular rubber products may be formed by decomposition of "blowing agents"

such as halocarbons, e.g. trichlorofluoromethane, azodicabonate and hydyazine, or by the direct aeration of the molten rubber stock with an inert gas. In either case, nitrogen will usually be employed as the infusing gas in order to avoid loss of internal gas to the atmosphere.

U.S. Pat. No. 2,666,036 to Schwencke discloses a process of producing cellular rubber like products employing resins which are not in themselves elastomeric. Thus, the Schwence process involves the foaming of a liquid formulation of polyvinylchloride homopolymers or copolymers in a plasticizer oil which also contains a water insoluble salt of a fatty acid containing from 12 to 22 carbon items, specifically aluminum stearate. The foam is cured to provide a cellular plastic similar to rubber products such as sponge rubber or foam rubber.

U.S. Pat. No. 3,856,719 to Miyamoto et al discloses a process for producing foamed thermoplastic resin articles which are characterized as having good flexibility and elasticity. The product is produced from a formulation of low-density and high density polyethylene, together with a polystyrene type resin. This includes a mixture of polystyrene as the main component together with a rubbery polymer containing at least 50 % by weight of polystyrene or a copolymer of styrene with diene monomers, such as styrene-butadiene copolymer. Miyamoto also discloses use of nucleating agents to provide the desired cell size of the foamed product. Suitable nucleating agents include a finely divided inorganic substances such as talc, clay, diatomaceous earth and silica. Also disclosed are organic substances such as the salt of citric acid and sodium bicarbonate which generate gases upon decomposition or chemically change at the extrusion temperature.

DISCLOSURE OF THE INVENTION

In accordance with the present invention there is provided a new and improved elastomer composition which may be subject to a foamed extrusion procedure to produce an elastomeric cellular product. The elastomer composition of the present invention comprises a mixture of two thermoplastic rubber compounds. At least one of the thermoplastic rubber compounds has a vinyl aromatic component. This thermoplastic rubber compound has a high aromaticity relative to the other rubber compound. The composition contains in addition a nucleating agent and an unstable detackifying resin. The nucleating agent functions, when gas is entrained in the molten formulation, to enhance the neutrophilic structure of the elastomer. The unstable resin is oxidized or thermally decomposed as the extruded composition is cured to form a nontactified skin i.e., a skin on the product having low tack.

In a preferred embodiment of the invention, the elastomer composition comprises a normally liquid plasticizing oil. The preferred plasticizer is polybutene which is present in a concentration greater than the concentration of at least one of the thermoplastic rubber compounds. Preferably the elastomeric composition also contains a minor amount of trans-polyoctenylene rubber, a polymer of cyclooctene having prevalently transisomeric double bonds.

In a further aspect of the invention there is provided in an elastomeric product having an internal material phase comprised of a mixture of two thermoplastic rubber compounds as described above and having gas cells dispersed within the internal phase to provide a cell volume of at least ten volume percent. In addition, the surface phase of the product is formed of a nontackified skin.

In a more specific embodiment of the invention, one of the thermoplastic rubber compounds is a styrene-ethylene/butylene-styrene triblock copolymer and the other is a styrene-ethylene/propylene block copolymer. The styrene content of the styrene-thylene/propylene copolymer is substantially greater than the styrene content of the triblock copolymer. The unstable resin is selected from the group consisting of aliphatic hydrocarbon resins, aromatic hydrocarbon resins, and mixtures thereof having a bromine number of at least 20.

In yet another aspect of the invention, there is provided a process for the production of elastomeric cellular products by heating the elastomer composition to a molten state and incorporating an inert gas into the heated composition to produce a foamed molten elastomer. The molten foam is extruded onto a solid substrate and cured to produce the solid elastomeric product having a detackified skin. In a further embodiment of the invention, the inert gas is incorporated into the molten elastomer composition by the decomposition of a blowing agent entrained within a plasticizing oil supplied to the molten composition.

BRIEF DESCRIPTION OF THE DRAWING

The drawing is a schematic illustration of a system useful in carrying out one embodiment of the invention.

BEST MODES FOR CARRYING OUT THE INVENTION

The present invention provides elastomer compositions which are especially well suited for use in the formation of cellular elastomeric products, particularly packing products such as are employed in gasket sponge rubber and sealant applications. These formulations are particularly adapted for use in hot melt extrusion applications. These techniques are conventionally used in the applications of foamed adhesives as described, for example, in Bak, DJ, "Foaming Action Improves Adhesive Performance," Design News May 26, 1980.

The basic ingredients in the elastomeric compositions of the present invention are a mixture of at least two thermoplastic rubber compounds, a nucleating agent, and an unstable detackifying resin. The rubber compounds are characterized in that one is highly elastomeric relative to the other, which has a vinyl aromatic component, and a high aromaticity relative to the more elastomeric compound. Both compounds may have, and in at least one application preferably do have, a vinyl aromatic component. Thermoset elastomeric polymers may also be present in the formulation provided that their degradation temperatures are higher than the temperatures at which the thermoplastic polymers are melted and processed in the application procedure.

Preferably, one thermoplastic rubber compound is an ABA triblock polymer of the type disclosed in the aforementioned patents to Unmuth et al and Doss et al for, example, and which has a relatively high elastomer content. More specifically it is preferred that the elastomer content be greater than the endblock content. An especially preferred thermoplastic elastomer in this regard is a styrene-ethylene/butylene-styrene triblock copolymer which the ratio of the center elastomer block to the styrene endblocks is greater than one and preferably greater than two. A suitable triblock copolymer for use in this regard is available from Shell Chemical Company under the trademark Kraton G-1652. This polymer has a ethylene/butylene centerblock to styrene endblock ratio of about 2.4.

The other preferred rubber component is a thermoplastic elastomer having a vinyl aromatic component and a high aromaticity relative to the first component. A preferred thermoplastic polymer for use in this regard is an AB diblock copolymer and more specifically is a styrene-ethylene/propylene block copolymer having a ratio of ethylene/propylene to styrene of less than two. A suitable styrene-ethylene/propylene block copolymer for use as the second component is Kraton GX-1701 from Shell Chemical Company. Other suitable copolymers having relatively high styrene contents which can be used to resist compression set may also be employed in the invention.

The two thermoplastic rubber compounds may be employed in the formulation in any suitable concentrations which will vary depending upon the desired properties of the final product and also the additional components, as described below, which are used in the formulation. Normally the first rubber compound will be present in a concentration within the range of 5-40 weight percent and the second compound present in a concentration within a range of 2-25 weight percent. In most applications the first, more rubbery resin will be present in a concentration which is equal to or greater than the concentration of the second polymer. In some cases, however, the concentration of the second thermoplastic compound may be greater than that of the first compound. In a broad aspect of the invention, the weight ratio of first polymer to second polymer may range from about 20 to about 0.4. Considering the more rubbery first thermoplastic polymer as the basic rubber, the second polymer concentration, expressed in terms of parts per hundred rubber (pphr), preferably is within the range of about 5-100.

Other thermoplastic rubber compounds, referred to herein as alternative compounds, may be substituted for one of the above-described AB or ABA copolymers depending on the application in which the composition is used. One thermoplastic elastomer suitable for use in some applications of the invention is ethylene/propylene rubber commonly referred to as EPR. Such ethylene/propylene copolymers generally exhibit an ethylene/propylene ratio within the range of about 1-3 and are highly elastic. Other suitable rubbers useful as alternative rubber compounds in accordance with the invention include ethylene/propylene terpolymers (commonly referred to as EPDM) which include a diene in addition to the ethylene/propylene monomers. Suitable dienes include nonconjugated open-chained diolefins and cyclic dienes.

Other thermoplastic rubber compounds suitable for use in the invention include isobutylene-isoprene copolymers, commonly termed butyl rubbers, and copolymers of butadiene and styrene, commonly referred to as styrene-butadiene rubber (SBR). The ratio of butadiene to styrene should normally be greater than 2:1. In some cases, it may be less than 2:1 when employed in a manner in which it is cross-linked to resist compression set of the final product. Additional alternative thermoplastic elastomer compounds include neoprene and silicone rubber gums. The former normally should not be used if polyvalent metal soaps, e.g., aluminum sterate as described hereinafter, are employed in the formulation. Acrylic rubber elastomers may also be used as an alternative rubber compound.

As described hereinafter, there are several modes of application which may be employed to produce an elastomeric packing product in accordance with the present invention. The composition based upon the ABA and AB copolymers as described previously can be used with blowing agents or with gas infusing hot-melt applicators of the type described hereinafter. The alternative thermoplastic rubber compounds described previously can be used in lieu of the AB diblock copolymer in conjunction with blowing agents to increase compression set resistance by cross-linking. The alternative cross-linkable compounds normally should not, however, be used with a hot-melt applicator since the composition will tend to undergo cross-linking and set-up within the applicator. The cross-linkable alternative rubber compounds may also be used in combination with the above-described AB copolymer (in place of the ABA triblock copolymer) in blowing agent applications in which the heated composition is placed under a relatively high shear stress when it is heated and the blowing agent incorporated into the heated composition.

The nucleating agent employed in the present invention may be any compatible agent which will enhance the neutrophilic structure of the molten elastomer formulation when gas is entrained therein. Specifically the nucleating agent may take the form of colloidal silicates, carbon black and the like which will add to the volume structure of the foamed elastomer faster than it increases the weight per gallon. The nucleating agent normally will be present in an amount ranging from about ¼% up to Vabout 5% by weight of the elastomer composition. Based in terms of the basic rubber component, the nucleating agent may be present in an amount within the range of 5-100 pphr. A suitable nucleating agent for use in the present invention is hydrous magnesium silicate available from Cyprus Industrial Minerals Co. under the trademark Miston Monomix. In addition to or as an alternative to the use of colloidal nucleating agent, the elastomer composition of the present invention may contain the metal salt of an aliphatic acid which functions as a lipophilic gelling agent. Such salts may take the form of alkali metal, alkaline earth metal, or trivalentmetal salts of $C_{12}$–$C_{22}$ fatty acids as described in the aforementioned patent to Schwencke. Examples of such salt include aluminum stearate, lithium stearate and calcium stearate. These gelling agents act to provide slump control and hold the closed cell bubble structure within the foamed composition as it cools down from the elevated temperature at which it is applied.

The unstable detackifying resin may be any suitable resin which oxidizes or decomposes thermally, either by itself or in conjunction with a drying agent as described hereinafter, to act as a skinning agent on the surface of the extruded product. Thus, the product when cured has an internal phase which is in the nature of a tacky mastic whereas the skin is in a relatively nontackified condition. Suitable resins include unstable forms of resins which are commonly employed in blocked copolymer systems to affect adhesion, hardness, viscosity and surface temperatures. The resins are sufficiently unsaturated to exhibit a bromine number of about 20 or more and preferably a bromine number of about 40 or more. Preferred detackifying resins include aliphatic hydrocarbon resins, aromatic hydrocarbon resins, and mixtures thereof characterized as noted above by a bromine number of at least 20. Such resins may be employed in amounts ranging from about 5-40 wt % and about 10-200 pphr. Other detackifying resins, which usually will be employed in combination with an aliphatic hydrocarbon resin or an aromatic hydrocarbon resin or both, are unsaturated esters of polymerized rosins.

A suitable unstable resin is a $C_5$ aliphatic hydrocarbon resin available under the trademark SB-100-2 from Sunbelt Chemicals, Inc. Another suitable detackifying resin is a $C-_9$ aromatic hydrocarbon resin available from Sunbelt Chemicals under the designation SB-1400. A suitable polymerized rosin ester, which preferably is used with one of the unstable aliphatic or aromatic resins is available from Hercules' Inc. under the trademark Dymerex.

Another surface skinning agent which may be employed in the present invention preferably in conjunction with an aliphatic or aromatic hydrocarbon resin is a hydrogenated methyl ester of rosin. While this material, when completely hydrogenated will not oxidize, it functions through decarboxylation to form rosin oil which migrates to the surface of the product carrying with it some of the colloidal nucleating agent. This aids in rendering the surface tack free. A suitable hydrogenated rosin ester is available form Hercules Inc. under the trademark Hercolyn D. This material may be employed in a concentration within the range of about 2-10 weight percent. Another nonstable resin useful in reducing surface tack is zinc resinate in a concentration of about 2-25 weight percent. This product is available from Reichhold Chemical Company under the trademark Zitro.

In addition to the previously described ingredients, it usually will be preferred to incorporate a normally liquid plasticizer into the formulation. In a broad sense, this may be of any plasticizer of the type normally employed in rubber compounding which is compatible with the other ingredients. The plasticizer may be present in a concentration within the range of 2 to about 40 wt %. A preferred concentration range is within the range of 20-200 pphr. Preferably, the plasticizer is added to the composition in an amount to provide a concentration which is greater than the concentration of at least one of the thermoplastic rubber compounds. Preferred plasticizers for use in the present invention are liquid silicon rubber and polybutene. Polybutene is especially preferred. It is desirable to use a polybutene having an average molecular weight within the range of 1800-40,000. This product is a liquid at room temperature having a viscosity of about 500 to 200,000 cp. The polybutene can be used in greater amounts than other plasticizers; in concentrations in excess of 40 wt % up to about 55 wt %. The presence of the second thermoplastic rubber compound tends to retain the polybutene plasticizer in the system and enables the use of relatively large quantities of polybutene, preferably in an amount greater than the concentration of the more rubbery thermoplastic polymer.

Yet another preferred ingredient used in the elastomer composition of the present invention is trans-polyoctenylene rubber (TOR). This polymer is a metathesis polymer of cyclooctene with prevalently trans-isomeric double bonds as contrasted with cisisomeric double bonds. For a more detailed description of TOR, reference is made to Draxler, A, "A New Rubber: trans-polyoctenamer" Elastomerics, February 1983, pp. 16-20. A suitable form of TOR is available from the Huels Corporation, New York, under the trademark Vestenamer 8012.

The use of TOR in the present invention is desirable in that it performs a number of functions other than simply as a process aid as it is conventionally used in rubber compounding. The TOR functions with the second thermoplastic polymer to retain the polybutene or other plasticizers within the system. Thus it enables relatively high concentrations of plasticizers to be employed without migration out of the system. In addition, the TOR improves the internal viscosity and flowability of the composition in the hot-melt form without reducing the melt point. It also functions in conjunction with the unstable resin to remove the surface tack of the extruded composition. The TOR is employed in a relatively minor amount usually less than about 10 wt %. Greater amounts, up to about 20 wt %, can be used and the TOR can be thermally cross linked at a temperature greater than the melt point.

Other ingredients which may be exployed to advantage in the present invention include boiled linseed oil and a hydrocarbon oil such as white mineral oil. The mineral oil functions as a processing aid and to prevent undue wear on the pumping equipment used in foaming and extruding the product. It also migrates to the surface of the extrudate with the nucleating agent. The linseed oil acts to reduce the intrinsic viscosity of the thermoplastic rubber compounds and to promote the formation of a uniform closed cell bubble structure. The mineral oil may be used in amounts up to about 10 weight percent of the composition. The boiled linseed oil normally will be present in smaller amounts, typically less than 1 weight percent.

Another additive useful in formulating the compositions of the present invention is solid amorphous polypropylene. The polypropylene acts in conjunction with the polybutene or other plasticizers to prevent slumping and to aid in the encapsulation of the gas within the system at the time the foam is produced. It also functions to increase the cohesive strength and elongation characteristics of the final product. Depending upon the desired characteristics of the final product, the amorphous polypropylene can be used in relatively large amounts to provide a concentration of up to about 50 weight percent. Substantially smaller amounts, down to about 5 weight percent or even less may also be used. A suitable polyproplene product for use in the present invention is available from Baychem International, Inc. under the trademark K-TAC 100. This product is an atactic amorphous polypropylene having an average molecular weight of about 2800.

In addition to the unstable resins described previously, other products may also be used in arriving at detackification of the skin of the final product. In this regard, minor amounts of a drying agent can be employed. The drying agent is present in a very small concentration, typically within the range of 0.01-0.1 weight percent. A suitable drying agent for use in this regard is cobalt napthanate available from Manchem Incorporated under the trademark Manobond C-16. This product increases oxidation of the unstable resins identified above at the temperatures at which the foamed product is extruded.

Synthetic waxes such as may be derived from esters of fatty acids may also be used to reduce the surface tack of the final product. Concentrations ranging from about 1-20% may be employed. A suitable wax derived from fatty acid esters in Paricin 220 available from Cas-Chem, Inc.

The elastomer compositions of the present invention can be foamed and extruded to the desired configuration of the final product by any suitable technique. They are readily usable in gas infusing hot melt applicators such as those available from the Nordson Corporation under the trademark Foamimelt. Nitrogen preferably will be used as the infusing gas in order to maintain internal pressure in the closed cell configuration. Typically the foaming operation may be at temperatures within the range of 320°–420° F. at gas infusion pressures within the range of 4–40 psig.

The use of the elastomer compositions of the present invention in "foamed in place" applications offers a number of advantages. They will solidify very quickly under ambient temperature conditions after being applied in the molten state. This minimizes the need for off line storage and obviates the cleanup operations and scrap disposal which are employed with slow curing formulations. As will become apparent from the examples given hereinafter, the elastomer compositions of the present invention may be formulated so that they skin over rapidly upon application, or they may skin slowly over periods of of hours or even days. In the latter case, the foamed products can be skinned rapidly upon the application of high intensity ultraviolet radiation.

The products have melt points ranging from about 240° F. to about 500° F. They exhibit good long term heat stability at temperatures ranging from about 190° to 500° F.

Elastomer compositions formulated in accordance with the present invention are set forth in the following examples. In a first set of the elastomer composition, the formulations were based upon styrene-ethylene/butylene-styrene triblock copolymers and styrene-ethylene/propylene block copolymers, as described above, and also contained aluminum stearate, a sterically hindered phenol antioxidant (2,2 methylene bis (4-methyl-6-tertiary pentyl phenol), white mineral oil, atactic amorphous polypropylene, polybutene, and C5-aliphatic hydrocarbon resin. In addition some compositions contained as optional inqredients a C9 aromatic hydrocarbon resin and a phenolic resin oil as described above.

A typical formulation procedure involves heating and mixing the ingredients in a high speed disbursement mixer. Thus, a suitable procedure includes the addition of a portion of the C5 aliphatic hydrocarbon resin to a portion of the polybutene heated to a temperature of 125° F. Thereafter the amorphous polypropylene is added with mixing and the mixture heated to a temperature of about 240° F. The remainder of the aliphatic hydrocarbon resin is then added with continued mixing. The antioxidant is then added followed by the styrene-ethylene/butylene-styrene block copolymer. As the triblock copolymer is added, the heat is turned off and the mixture allowed to cool. During cooling, the styrene-ethylene/propylene block copolymer is added over a prolonged period of time during which the temperature falls to a near room temperature. Thereafter the aluminum stearate and white mineral oil are added in sequence. The remainder of the polybutene is then added and mixing continued until a homogeneous blend is obtained. Where the optional C9 aromatic hydrocarbon resin and the phenolic resin are employed, these ingredients are added after the addition of the final batch of aliphatic hydrocarbon resin and before addition of the antioxidant. The formulation sequence described above is not considered to be critical, but is simply one suitable technique of producing the elastomer composition.

Table I sets forth the relative concentrations in wt % of ingredients in 5 elastomer compositions prepared in accordance with the above procedure. In Table I the formulations are identified as formulations 1–5 and the ingredients are designated as follows: aluminum stearate-A antioxidant-B, white mineral oil-C, styrene-ethylene/butylene-styrene triblock copolymer-D, styrene-ethylene/propylene block copolymer-E, amorphous polypropylene-F, polybutene-G, aliphatic hydrocarbon resin-H, aromatic hydrocarbon resin-I, and phenolic resin oil-J. Typical physical characteristics for the formulations set forth in Table I are set forth in Table II.

TABLE I

| Component | Concentration, wt % | | | | |
|---|---|---|---|---|---|
| | 1 | 2 | 3 | 4 | 5 |
| A | 1.7 | 2.1 | 2 | 1.8 | 1.7 |
| B | 0.7 | 0.2 | 0.2 | 0.2 | 0.1 |
| C | 3.7 | 4.5 | 4.2 | 4 | 3.7 |
| D | 14.7 | 17.6 | 16.6 | 15.7 | 13.6 |
| E | 3.7 | 4.8 | 4.6 | 4.3 | 3.7 |
| F | 18.4 | 21.8 | 21.5 | 19.4 | 17 |
| G | 25 | 18.3 | 17.3 | 16.3 | 30 |
| H | 18.4 | 30.7 | 34.7 | 38.2 | 30.2 |
| I | 7 | | | | |
| J | 7 | | | | |

TABLE II

| Typical Test Data | 1<br>O-55 | 2<br>O-55-10 | 3<br>O-55-20 | 4<br>O-55-30 | 5<br>O-55-40 |
|---|---|---|---|---|---|
| Color | G-2 | G-4 | G-4 | G-4 | G-5 |
| Taste | None | None | None | None | None |
| Odor | None | None | None | Very Slight | Slight |
| Weight/Gallon | 7.8 | 7.8 | 7.8 | 7.8 | 7.7 |
| Water Resistance | Excellent | Excellent | Excellent | Excellent | Excellent |
| Heat Resistance For 2 Weeks @ 190° F. | No Effect | No Effect | No Effect | No Effect | No Effect |
| Melt Point Ball & Ring | 295° F. | 285° F. | 280° F. | 260° F. | 240° F. |
| Heat Stability After 24 Hours @ 350° F. | −20% | −18% | −18% | −18% | −12% |
| Solids Content | 98.5 | 98.5 | 98.4 | 98.3 | 98.2 |
| Shelf & Service Life | 20 yrs. | 20 yrs. | 20 yrs. | 20 yrs. | 20 yrs. |
| Plasticizer Migration | None | None | None | None | None |
| Adhesive Tensile (Peel) | 3 PLI | 5 PLI | 8 PLI | 10 PLI | 12 PLI |

TABLE II-continued

| Typical Test Data | 1<br>O-55 | 2<br>O-55-10 | 3<br>O-55-20 | 4<br>O-55-30 | 5<br>O-55-40 |
|---|---|---|---|---|---|
| Aging Characteristics | Slight haze on surface | Slight haze on surface | Slight haze on surface | Slight haze on surface | Slight haze on surface |
| MBMA Water Damming Test | Passes | Passes | Passes | Passes | Passes |

These products are capable of retaining an open, pressure-sensitive mastic status for periods ranging up to 24 hours in the case of formulation number 1. Alternatively, they may be "skinned" in a manner of minutes by the application of high intensity ultraviolet light.

A second group of elastomer compositions were prepared which skinned over at the application temperature almost immediately without the application of ultraviolet light. These formulations included the components identified above as ingredients A through I and in addition contained one or more of the ingredients identified as follows: boiled linseed oil-J, polymerized rosin ester-K, cobalt naphthanate-L and fatty acid ester wax-M, all as described previously.

For this set of compounds, a mixing protocol similar to that described above may be followed with the polymerized resin ester and $C_9$ aromatic hydrocarbon resin added after the antioxidant and the the mineral oil and the fatty acid ester wax added respectively before and after the aluminum stearate. The boiled linseed oil and cobalt napthanate may be added after the final batch of polybutene during the final mix phase.

Elastomer compositions formed in accordance with this procedure as set forth in Table III below with components A-I designating the ingredients as described above with respect to the formulations of Table I and the remaining ingredients designated as noted. The formulations set forth in Table III have somewhat higher melt points, about 344° F., and better heat stability at 350° F. than those shown in Table I. These formulations may be foamed and applied at a temperature within the range of about 340°-360° F. whereas those shown in Table I should be applied at temperature within the range of about 325°-350° F.

TABLE III

| | Concentration, Wt % | |
|---|---|---|
| Components | 6 | 7 |
| A | 2.5 | 2.5 |
| B | 1.0 | 1 |
| C | 3.8 | 3.8 |
| D | 20.6 | 20.1 |
| E | 5 | 5.0 |
| F | 18 | 18.1 |
| G | 10 | 10 |
| H | 25.1 | 12.6 |
| I | 10.0 | 10 |
| J | | 0.3 |
| K | | 12.6 |
| L | | 0.03 |
| M | 4 | 4 |

An additional elastomeric composition embodying the present invention is somewhat similar to composition number 5 (Table I) and contains in addition a hydrogenated methyl ester of rosin and hydrous magnesium silicate nucleating agent, both of which have been described previously and are identified herein by the legends O and P, respectively. This formulation contains in addition a high tensile mastomeric available from Q'SO Inc. Saginaw, Tex., under the trademark Q-202. This component, which is employed only as a pigmentation agent is identified herein by the legend R. This product is set forth in Table IV and identified as composition No. 8. This product is capable of maintaining a pressure sensitive mastic status after cooling for a period of several days, and like those shown in Table I can be "skinned" almost immediately by the application of high intensity ultraviolet light. Its physical characteristics are similar to those set forth in Table II except that it has a higher adhesive tensile strength (12 PLI) and a somewhat lower tensile strength. It exhibits 2500% elongation at its breaking point.

Another composition embodying the present invention includes the ingredients identified previously by the legends A through G, O, P and R, and in addition contains the zinc resinate described previously and identified herein by the legend S. This composition is set forth in Table IV as product No 9. It exhibits a high melting point, about 340° F., and sets up upon cooling to provide a detackified skin surface.

TABLE IV

| | Concentration, Wt % | |
|---|---|---|
| Components | 8 | 9 |
| A | 1.5 | 1.7 |
| B | 0.1 | 0.9 |
| C | 3.4 | 3.3 |
| D | 13.6 | 22.3 |
| E | 5.1 | 9 |
| F | 16.3 | 13.6 |
| G | 25.5 | 17.1 |
| H | 28.8 | |
| O | 3.1 | 9.4 |
| P | 1.4 | 1.7 |
| R | 1.4 | 4.1 |
| S | | 17.1 |

Yet a further embodiment of the present invention may be prepared employing the previously described block copolymer and triblock copolymer mixture together with a colloidal nucleating agent polybutene, unstable resin, lithium stearate and the metathesis polymer of cyclooctene as described previously. An example of this formulation identified herein as product No. 10 is set forth in Table V. Ingredients D, E, G, H and P are as described previously and the lithium stearate and polycyclooctene are indicated by legends T and U, respectively.

TABLE V

| Components | Concentration, wt % |
|---|---|
| D | 23.9 |
| E | 6.4 |
| G | 40.6 |
| H | 13.8 |
| P | 5.2 |
| T | 3.5 |
| U | 6.7 |

This composition produces a detackified skin immediately upon cooling and exhibits physical characteristics similar to those observed for composition no. 9.

As noted previously, the elastomeric composition of the present invention may be employed to form packing products such as gaskets and seals. The compositions are particularly well suited to "foamed in place" applications. The foamed hot-melt may be placed on a substrate surface and a second conforming surface then brought into place and into contact with the hot-melt before it is cured, thus shaping the gasket as it cures to the desired configuration. An example of this application is in the formation of a gasket on an automobile fender when a frame for a tail light lens or the like is applied to the fender. Other applications involve the formation of seals for closures on containers, vibration dampeners, and bedding seals for windows and doors.

After formulating the elastomer composition of the invention by any suitable technique such as the mixing protocol described previously, the molten product may be poured into a suitable storage container where it is allowed to solidify. When the product is to be used, it is heated to a temperature sufficient to convert the solid elastomer composition to the molten state. Normally the elastomer composition will be heated to a temperature of at least 275° F. and at which it exhibits a viscosity within the range of about 500–150,000 centiposes. Viscosities within this range are suitable for foaming applications. After heating the elastomer composition to the desired temperature, an inert gas is incorporated into the molten composition by any suitable technique such as through the use of a hot-melt infusor as described previously. The gas should be entrained in the molten composition to provide an amount within the range of 20–70 volume percent based upon the volume of the liquid composition. Thereafter the heated foamed product is extruded onto the desired substrate material and then cured to form a solid elastomeric product having a detackified skin. For most gasket applications, such as in closure seals for applicances and the like, the surface skin should have a peel strength of less than ½ pound per linear inch.

Blowing agents can also be employed in foaming the elastomer compositions to arrive at the final product. A preferred mode of incorporating a foaming agent in accordance with the present invention involves the use of a heat actuated foaming agent entrained in a plasticizing oil of the type described previously. Thus, the elastomer composition may be heated to the desired hot-melt application temperature which is above the decomposition temperature of the blowing agent and applied to a suitable mixing device. A solution of the blowing agent in plasticizing oil at a lower temperature below the decomposition temperature of the blowing agent, e.g., room temperature, is concomitantly applied to the mixing device where it is mixed with the heated elastomer composition. As the blowing agent is incorporated within the molten elastomer composition and heated, it undergoes decomposition with the attendant generation of foaming gas.

It usually will be preferred to entrain the foaming agent in the same olasticizing oil as used in the elastomeric composition, and to reduce the plasticizing oil concentration in the elastomer composition accordingly so that when the two feeds are mixed the desired plasticizer concentration is arrived at in the hot foamed product. For example, and with reference to product number 10 described previously, the polybutene concentration in the elastomer product may be reduced by half and the equivalent amount of polybutene, then used as a carrier fluid for the blowing agent. A suitable blowing agent for use in this regard is azodicarbonamide available from Uniroyal Chemical Company under the trademark Celogen AZ. Thus, with reference to product number 10, 80 parts of the elastomer composition (with the polybutene concentration reduced by half) may be heated to a temperature of about 400° F. and applied to the extrusion system. 20 parts by weight of polybutene at room temperature and containing the blowing agent in a suitable concentration, e.g., about 2 weight percent, may then be applied to the mixing device where it is mixed with the elastomer composition. If desired, the polybutene feed may be preheated so long as its temperature remains below the decomposition temperature of the blowing agent. In any case, upon mixing of the polybutene solution with the melted elastomer product, the blowing agent decomposes with the generation of the inert gas to form the foamed cellular product, which is then dispensed onto a suitable substrate.

This embodiment of the invention may be carried out with an elastomer composition based upon one of the alternative cross-linkable rubber compounds in combination with an ABA triblock copolymer, specifically a polystyrene-ethylene/butylene-styrene copolymer as described above. In this case, the elastomer composition will contain the two rubber components, polybutene (or other plasticizer) and, optionally, nucleating agent. The secondary stock will comprise a carrier, normally polybutene or other plasticizing liquid, a cross-linking agent to cross-link the unsaturated alternative rubber compound, and preferably the nucleating agent. The secondary stock has a lower viscosity than the base elastomer composition at the same temperature. While the nucleating agent can be employed in either the base elastomer stock or the secondary blowing-agent stock (or both), it is preferred that it be present in the latter because of its lower viscosity.

It is preferred that the blowing agent stock contain an accelerator to increse the cross-linking rate of the unsaturated polymer. The type and quantity of cross-linking agent and accelerator will depend some extent upon the nature and amount of the unsaturated cross-linkable rubber compound, as will be readily understood by those skilled in the art. Suitable cross-linking agents that are commonly employed in rubber compounding and can be used in this invention include sulfur and organic peroxides such as dialkylperoxides, diacylperoxides and hydroperoxides. The accelerators also may be of any suitable type, either organic or inorganic. Such accelerators include aldehydeamines, dithiocarbamates, thiozete, xanthate, and sulfonamides such as are commonly employed as accelators in rubber compounds.

In some cases, the cross-linking agent and accelerator may be dispensed with. For example, unsaturated thermoplastic rubber compounds such as nucrel, acrylic and EPR can be cured, after mixing with the blowing agent, through the application of ionizing or non-ionizing radiation. An example is nucrel and a free radical initiator. Of course, in the embodiment of the invention in which compression set is achieved through the use of an AB polymer; that is where the elastomer composition contains an ABA triblock copolymer and an AB diblock copolymer, the latter being used for compression set; a cross-linking agent and accelerator are not necessary.

Turning now to the drawing there is shown a schematic illustration of a system useful in forming the elastomeric packing product through the application of a blowing agent. As shown in the drawing, the base stock is heated in a container 1 equipped with a pumping mechanism 2. The molten base stock, typically at a temperature of at least 400° F., is applied via line 3 and a surge chamber 4 to an elongated mixing chamber 5. The secondary stock comprising the blowing agent in a suitable carrier, e.g., a plasticizer liquid preferably polybutene, and also containing accelerator and cross-linking agent, if necessary, is withdrawn from a container 6 equipped with a pumping unit 7. The secondary stock is applied via line 8 and surge chamber 9 to the mixing chamber 5. The flow system from container 6 to the mixing chamber is at ambient temperature or in any case below the decomposition temperature of the blowing agent.

The blowing agent stock preferably contains a nucleating agent, although, as was noted previously, nucleating agent can also or alternatively be present in the base stock. The concentration of the nucleating agent should in any case be such that it will be within the range of ¼–5 wt. % of the total combined composition within the mixing chamber 5. The nucleating agent should not be substantially in excess of about 5 wt. % in order to avoid overextension of the composition so that the structure of the composition collapses, preventing the attainment of the desired closed cellular configuration. The volumetric feed rate of the secondary stock to the mixing chamber will be substantially less than the feed rate of the primary stock. Preferably, the two compositions are applied to the mixing chamber at rates to provide a volume ratio of primary stock to secondary stock within the range of 1–10. Normally, this ratio will be near the upper end of this range, i.e., about 10. Within the time that the mixed composition flows through the mixing chamber, typically about 3 seconds, the blowing agent decomposes to generate nitrogen gas and the foamed hot melt is dispensed via nozzle 10 onto the desired substrate.

Having described specific embodiments of the present invention, it will be understood that modifications thereof may be suggested to those skilled in the art, and it is intended to cover all such modifications as fall within the scope of the appended claims.

I claim:

1. An elastomeric packing product of closed cellular structure having an internal material phase comprised of a mixture of at least two thermoplastic rubber compounds, one of said thermoplastic rubber compounds having a vinyl aromatic component and a high aromaticity in relation to the other of said compounds, said other compound being more elastomeric than said compound of high aromaticity, gas cells dispersed within said internal phase to provide a cell volume of said product of at least 10 volume percent, and a surface phase formed of a non-tackified skin.

2. The product of claim 1 wherein the thermoplastic rubber of high aromaticity is a styrene-ethylene/propylene diblock copolymer and the other thermoplastic rubber is a styrene-ethylene/butylene-styrene triblock copolymer.

3. The product of claim 2 wherein the ratio of ethylene/butylene to styrene in said triblock copolymer is greater than 1.

4. The product of claim 3 wherein said ratio is greater than 2.

5. The product of claim 4 wherein the ratio of ethylene/propylene to styrene in said diblock copolymer is less than 2.

6. The product of claim 1 wherein said internal phase contains a plasticizing oil.

7. The product of claim 6 wherein said plasticizing oil is polybutene.

8. The product of claim 1 further comprising a minor amount of trans-polyoctenylene rubber.

9. The product of claim 1 further comprising a colloidal solid nucleating agent dispersed within said internal phase.

10. In a process for the production of an elastomeric packing product, the steps comprising
(a) heating an elastomer composition containing a detactifying resin, a first thermoplastic rubber compound, and a second thermoplastic rubber compound having a vinyl aromatic component and a high aromaticity relative to said first thermoplastic rubber compound to a temperature at which said composition is in a molten state:
(b) incorporating an inert gas into said heated composition to produce a foamed elastomer composition;
(c) dispensing said heated foamed composition onto a solid substrate material;
(d) setting said foamed composition to produce a solid elastomeric packing having a detactified skin.

11. The process of claim 10 wherein said elastomer composition contains a plasticizing oil.

12. The process of claim 11 wherein said plasticizing oil is polybutene.

13. The process of claim 12 wherein said polybutene is present in said elastomer composition in a concentration greater than the concentration of at least one of said thermoplastic rubber compounds.

14. The process of claim 12 wherein said polybutene is present in said elastomer composition in a concentration greater than said first thermoplastic rubber compound.

15. The process of claim 12 wherein said elastomer composition contains a minor amount of trans-polyoctenylene rubber.

16. The process of claim 15 wherein said elastomer composition further contains a colloidal solid nucleating agent which enhances the neutrophilic structure of said heated foamed composition.

17. The process of claim 16 wherein said elastomer composition further contains a minor amount of a metal salt of an aliphatic acid which functions as a lipophilic geling agent.

18. The process of claim 17 wherein said salt is lithium stearate.

19. The process of claim 10 wherein said inert gas is incorporated into said heated elastomer composition by the decomposition of a blowing agent.

20. The process of claim 19 wherein said blowing agent is incorporated into said heated elastomer composition by mixing a solution of said blowing agent in a plasticizing oil at a temperature below the decomposition temperature of said blowing agent with said heated elastomer composition whereby said blowing agent is entrained in said elastomer composition and heated to its decomposition temperature to generate said inert gas.

21. The process of claim 20 wherein said heated elastomer composition initially contains a plasticizing oil.

22. The process of claim 21, wherein the plasticizing oil initially contained within said elastomer composition and which contains said blowing agent and is mixed with said elastomer composition is polybutene.

23. An elastomeric packing product of closed cellular structure having an internal material phase comprised of a mixture of at least two rubber compounds, one of said rubber compounds comprising an ABA triblock copolymer of styrene-ethylene/butylene-styrene, the other of said rubber compounds being less elastomeric than said ABA triblock copolymer, and having a higher resistance to compression set than said ABA triblock copolymer and selected from the group consisting of a thermoplastic copolymer having a vinyl aromatic component and a high aromaticity in relation to said ABA triblock copolymer and a cross-linked elastomer, gas cells dispersed within said internal phase to provide a cell volume of said product of at least 10 volume percent, and a surface phase formed of a nontackified skin.

24. The product of claim 23 wherein the gas cells dispersed within said internal phase provide a cell volume of said product within the range of 20–70 volume %.

25. The product of claim 24 wherein said internal phase contains a normally liquid plasticizer in an amount greater than at least one of said rubber compounds.

26. The product of claim 25 wherein said normally liquid plasticizer is present in an amount greater than the concentration of said ABA triblock copolymer.

27. The product of claim 25 wherein said plasticizer is polybutene.

28. The product of claim 23 wherein the other of said rubber compounds is a cross-linked elastomer selected from the group consisting of ethylene/propylene rubber, ethylene/propylene terpolymer, butyl rubber, styrene-butadiene rubber, neoprene, silicone rubber gum and acrylic rubber in mixtures thereof.

29. In a process for the production of an elastomer packing product, the steps comprising:
(a) heating an elastomer composition to a temperature at which said composition is in a molten state, said composition containing a mixture of at least two rubber compounds and a detackifying resin, one of said rubber compounds comprising an ABA triblock copolymer of styrene-ethylene/butylene-styrene and the other of said rubber compounds being selected from the group consisting of a thermoplastic copolymer having a vinyl aromatic component and a high aromaticity in relation to said ABA triblock copolymer and a cross-linkable thermoplastic elastomer;
incorporating an inert gas into said heated composition to produce a heated foamed elastomer composition;
(c) dispensing said heated foamed elastomer composition onto a solid substrate material; and
(d) setting said foamed composition to produce a solid elastomeric packing having a detackifying skin.

30. The process of claim 29 wherein said inert gas is incorporated into said heated elastomer composition by mixing a secondary stock with said heated elastomer composition as a primary stock, said secondary stock comprising a carrier fluid containing a blowing agent which upon being mixed with said heated elastomer composition is heated to its decomposition temperature to generate said inert gas, said secondary stock initially being at a temperature below the decomposition temperature of said blowing agent.

31. The process of claim 30 wherein the carrier fluid of said secondary stock comprises a plasticizing oil.

32. The process of claim 31 further comprising a nucleating agent in at least one of said primary stock and said secondary stock.

33. The process of claim 32 wherein said nucleating agent is present in at least said secondary stock.

34. The process of claim 33 wherein said nucleating agent comprises a solid colloidal nucleating agent in an amount to provide a concentration thereof when said primary and secondary stocks are mixed in an amount within the range of $\frac{1}{4}$–5 wt. %.

35. The process of claim 34 wherein said plasticizing oil comprises polybutene.

36. The process of claim 35 wherein the concentration of polybutene in said heated foamed elastomer composition is greater than the concentration of said ABA triblock copolymer in said composition.

37. The process of claim 30 wherein the other of said rubber compounds is cross-linkable thermoplastic elastomer.

38. The process of claim 37 wherein said secondary stock contains a cross-linking agent for said cross-linkable elastomer.

39. The process of claim 38 wherein the carrier fluid of said secondary stock comprises a plasticizing oil.

40. The process of claim 39 wherein said plasticizing oil comprises polybutene and wherein said primary stock also contains polybutene as a plasticizing oil.

41. The process of claim 37 wherein the concentration of polybutene after mixing said primary and secondary stocks to produce said heated foamed elastomer composition is greater than the concentration of said ABA triblock copolymer in said composition.

42. The process of claim 41 wherein said secondary stock includes an accelerator to increse the rate of action of said cross-linking agent.

43. The process of claim 39 wherein said primary and secondary stocks are mixed at rates to provide a volume ratio of primary stock to secondary stock within the range of 1–10.

44. In a process for the formation of an elastomeric packing product on a substrate surface, the steps comprising:
(a) providing a primary stock elastomer composition containing a mixture of at least two thermoplastic polymeric elastomer compounds and a plasticizer,
(b) heating said primary stock composition to a temperature at which said composition is in a molten state,
(c) providing a secondary stock comprising a heat-activated blowing agent contained in a carrier fluid, said secondary stock being at a lower temperature than the temperature of said molten primary stock,
(d) mixing said molten primary stock and said secondary stock together to provide a resulting composite mixture of said first and second stocks in which said blowing agent is entrained in said composite mixture, said primary and secondary stocks being mixed together in relative proportions to provide a temperature of the resulting composite mixture sufficient to generate gas from said blowing agent to form a foamed mixture, and
(e) applying the resulting heated foamed mixture onto said substrate to form said elastomeric packing product.

45. The method of claim 44 further comprising the step, prior to mixing step (d), of heating said secondary stock to a temperature above ambient conditions but below the level at which gas is generated from said blowing agent.

46. The method of claim 44 wherein the foamed composition on said solid substrate surface is cured while in place on said substrate surface.

47. The method of claim 44 wherein said plasticizer in said primary stock is present in a concentration greater than the concentration of at least one of the thermoplastic elastomeric compounds in said primary stock.

48. The method of claim 44 wherein said primary stock elastomer composition contains a mixture of a first thermoplastic rubber compound in an amount of 100 parts, a second thermoplastic rubber compound present in an amount within the range of 5-100 pphr based upon said first rubber compound and a plasticizer within the range of 20-200 pphr based upon said first rubber compound.

49. The method of claim 48 wherein the carrier fluid for said secondary stock comprises plasticizer oil and wherein said primary and secondary components are mixed in relative proportions so that the amount of plasticizer oil in the composite mixture is within the range of 20-200 pphr.

50. The method of claim 49 wherein said plasticizer in said primary and secondary stocks is polybutene.

51. In a process for the formation of an elastomeric packing product on a substrate surface, the steps comprising:

(a) providing a primary stock elastomer composition containing a mixture of at least two polymer compounds and a plasticizer, one of said polymer compounds being a thermomplastic rubber and the other of said compounds being a thermoplastic rubber which is less elastomeric than said one compound or a cross-linkable thermoplastic compound, (b) heating said primary stock composition to a temperature at which said composition is in a molten state, (c) providing a secondary stock comprising a heat-activated blowing agent contained in a carrier fluid, said secondary stock being at a lower temperature than the temperature of said molten primary stock, (d) mixing said molten primary stock and said secondary stock together to provide a resulting composite mixture of said first and second stocks in which said blowing agent is entrianed in said composition mixture, said primary and secondary stocks being mixed together in relative proportions to provide a temperature of the resulting composite mixture sufficient to generate gas from said blowing agent to form a foamed mixture, and (e) applying the resulting heated foamed mixture onto said substrate to form said elastomeric packing product.

52. The method of claim 51 wherein when said primary and secondary stocks are mixed in step (d), said secondary stock is of a lower viscosity than said primary stock.

53. The method of claim 52 wherein said secondary stock contains a nucleating agent.

* * * * *